(12) United States Patent
Jaekel

(10) Patent No.: US 7,440,868 B2
(45) Date of Patent: Oct. 21, 2008

(54) METHOD FOR DETERMINING A POSITION OF AN OBJECT

(75) Inventor: Uwe Jaekel, Sankt Augustin (DE)

(73) Assignee: NEC Corporation, Tokyo (JP)

( * ) Notice: Subject to any disclaimer, the term of this patent is extended or adjusted under 35 U.S.C. 154(b) by 535 days.

(21) Appl. No.: 10/803,982

(22) Filed: Mar. 19, 2004

(65) Prior Publication Data

US 2004/0199357 A1     Oct. 7, 2004

(30) Foreign Application Priority Data

Mar. 24, 2003   (DE)   ................ 103 13 139

(51) Int. Cl.
  *G01C 9/00* (2006.01)
(52) U.S. Cl. .................................... 702/150
(58) Field of Classification Search ................ 702/150, 702/151, 152; 73/1.79; 705/35, 38, 36 R, 705/37
  See application file for complete search history.

(56) References Cited

U.S. PATENT DOCUMENTS 4,725,146 A *   2/1988   Hutchin ..................... 356/615
5,438,518 A *   8/1995   Bianco et al. ............... 473/407
6,611,737 B1 *  8/2003   El-Tahan et al. ............. 701/21

FOREIGN PATENT DOCUMENTS

JP       8-185441      7/1996
JP       10-49597      2/1998

OTHER PUBLICATIONS

M. B. Giles, et al.: "Adjoint Error Correction for Integral Outputs"; Report No. 01/18; Oxford University Computing Laboratory, Numerical Analysis Group; Wolfson Building, Parks Road, Oxford, England OX1 3QD, 2001.
L. Ingber: "High-resolution path-integral development of financial options"; Physica A; vol. 283; pp. 529-558; 2000.

* cited by examiner

*Primary Examiner*—John Barlow
*Assistant Examiner*—Aditya S. Bhat
(74) *Attorney, Agent, or Firm*—Sughrue Mion, PLLC

(57) ABSTRACT

A method for the determination of the position, in particular the future position, of an object, in particular of a particle or the like, in which case the progression of the position of a reference object is determined, in which case the reference object passes through a process and in which case the differences of the positions of the object and of the reference object are formed, has been designed for the purpose of a good determination of the position of the object with simultaneously the lowest possible technical expenditure in such a manner that error position terms are formed from the differences, and that the error position terms are weighted with at least one correction factor.

5 Claims, 3 Drawing Sheets

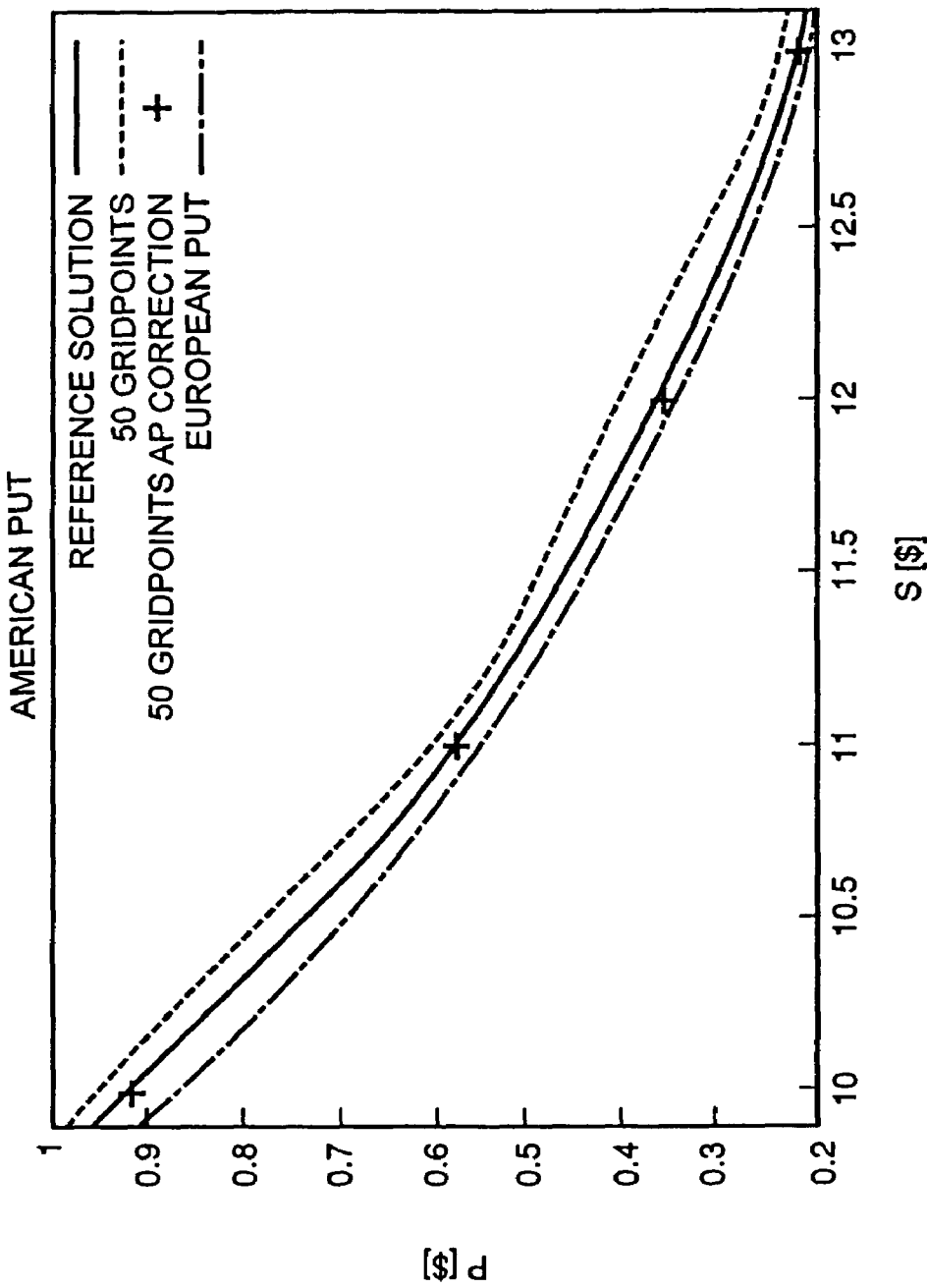

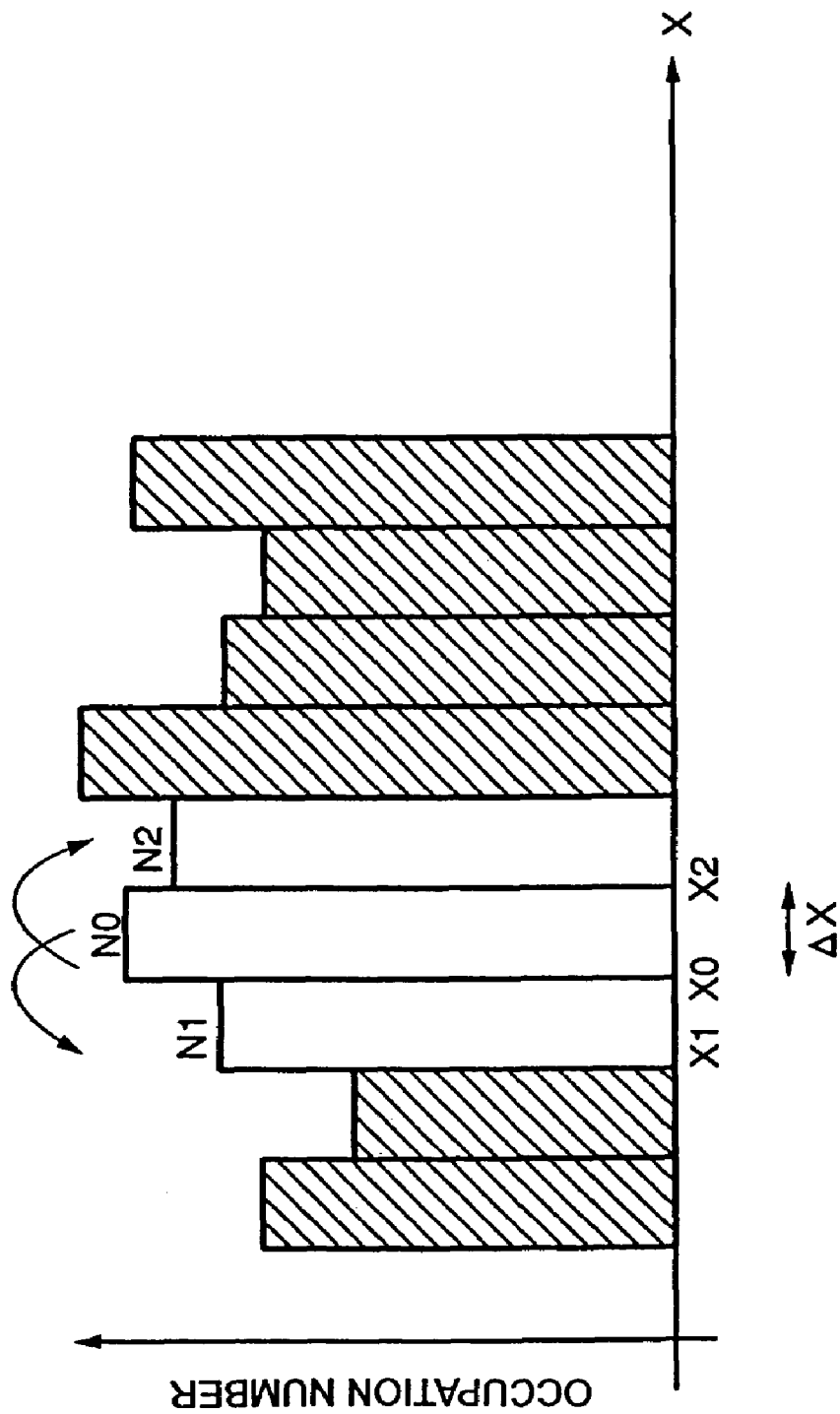

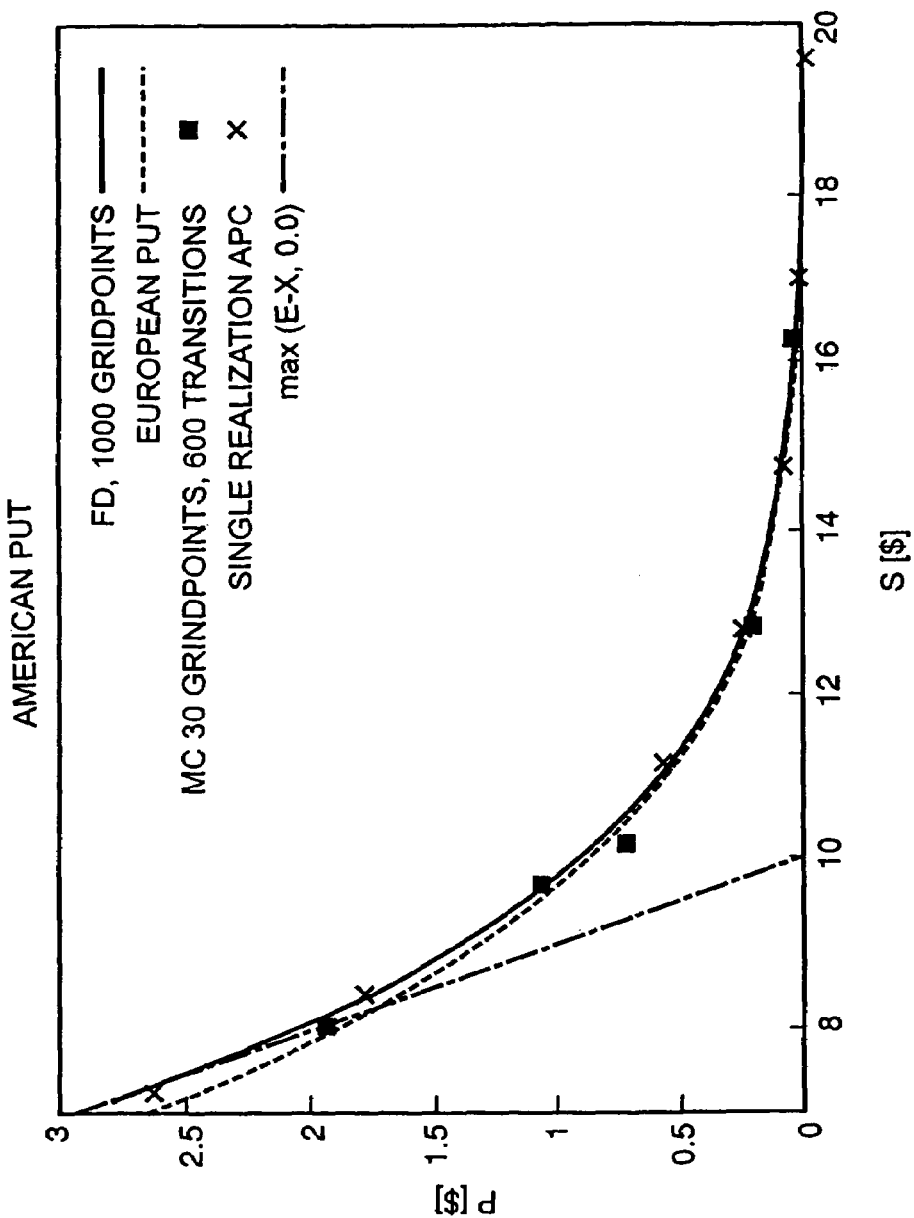

METHOD FOR DETERMINING A POSITION OF AN OBJECT

BACKGROUND OF THE INVENTION

1. Field of the Invention

The invention relates to a method of determining the position, in particular the future position, of an object, in particular of a particle or the like. The progression of the position of a reference object is determined, wherein the reference object passes through a process and differences of the positions of the object and of the differential object are formed.

2. Description of the Related Art

In many physical and in various technical systems, it is necessary to know the position, in particular the future position, of an object, for example in order to avoid damage, which can occur on account of the fact that the object is located in a position in which such damage is caused. Different methods to determine the position are known in this context, in which case the progression of the position of a reference object is determined and the differences of the positions of the object and of the reference object are formed. In this context, the reference object is a reference object, whose dynamics can be determined well. A general problem in the case of the known methods is that they often yield only inadequate results, since the methods used for the determination of the position yield accurate results only at the expenses a very high technical expenditures. If such technical means are not available, the results are often unusable.

SUMMARY OF THE INVENTION

Therefore, an object of the present invention is to provide a method for the determination of the position of an object of the type mentioned above with the help of which a good determination of the position of the object is made possible simultaneous with the lowest possible technical expenditures.

In accordance with the invention, the previously defined objective is achieved by the method for the determination of the position of an object with the characteristics of claim 1. The position may be a future position and the object may be a particle or the like. The claimed method is characterized by comprising: determining a progression of the position of a reference object passing through a process; forming differences of positions of the object and of the reference object; forming error position terms from the differences; and weighting the error position terms with at least one correction factor.

The method at issue for the determination of the position of an object is designed and modified so that error position terms are formed from the differences, and that the error position terms are weighted with at least one correction factor.

It was recognized in accordance with the invention that, by introducing weighted error position terms, the technical expenditures, for example, the amount of computation during simulations, can be kept low in a particularly simple fashion.

With respect to a particularly simple embodiment, the error position terms weighted with the correction factor can be added up. A correction factor would therefore be obtained that is particularly simple to determine, and also provides for a good correction. In another advantageous way, the correction factor could be calculated by an adjoint process. In this case, the adjoint process could be a process that, as a function of time, runs in the direction opposite to the process of the reference object. In the context of a particularly simple embodiment, the weighted and summed error position terms could be added to the position of the reference object in order to determine the position of the object.

In the context of a particularly simple embodiment, the object could also be an American option and the reference object the equivalent European option. The position could then be the early exercise price and the error position term, in this case, would be the error price term and the correction factor the constant.

In a manner in accordance with the invention, the early exercise price could then be calculated for a stipulated optimization method, for example, the Monte Carlo or finite-difference method, i.e., the price difference between the American and European options. Preferably, this could be achieved by summing of an error price term that is already calculated by most methods. This term could be weighted in a particularly advantageous fashion by a constant that could be calculated by a correspondingly selected adjoint process. The adjoint process, in another advantageous way, could develop, as a function of time, in the direction opposite to the original process, which determines the price development of the European options, in which case, for example, a development parameter could be the formal linking operator of the European price operator. The price of the American options could then simply be calculated by estimating the early exercise premium, owing to the fact that said price is added to the price of the corresponding European option. Numerical errors in the deficient simulation methods could therefore be compensated by this method and better estimates achieved than with the pure numerical methods, on which the method in accordance with the invention is based. For example, this permits a rapid simulation based on the coarse grids of the finite difference method. It is thus also possible to overcome the practical limits of the underlying method and to make the evaluation of complex options with a number of base values possible.

The method is particularly well suited for estimating American standard options with a single base value and can be used with particular advantage as a supplement to the finite-difference method and the Monte Carlo method. Implementation occurs in another advantageous way in Java.

The method might also be applicable to a variety of controlled or uncontrolled processes, in particular in processes subject to automatic controls. With reference to the already explained embodiment relating to the estimation of option prices, the price of a European option could be an uncontrolled process, since it is independent of external influences of the holder. Accordingly, when determining the price of an American option, a controlled process could be involved, since, in this case, an optimal price determination should take place, i.e., that the option could be exercised as soon as the price falls below the intrinsic value of the option. In this manner, the other embodiments can also be applied and transferred to controlled and uncontrolled processes without difficulty.

There are now various possibilities of advantageously designing and modifying the teachings of the present invention. For this purpose, the claims subordinate to claim 1, on the one hand, and the subsequent explanation of preferred practical examples of the method in accordance with the invention for the determination of the position of an object with the help of the drawing, on the other, are referred to. Generally preferred embodiments and modifications of the teachings are also explained in conjunction with the explanation of the preferred practical examples of the method in accordance with the invention for the determination of the position of an object with the help of the accompanied drawing.

BRIEF DESCRIPTION OF THE DRAWINGS

FIG. 1 shows a practical example of the dependence of an American option with a risk-free interest rate r=0.1, volatility σ=0.4, exercise price E=$10, in which case the option expires in six months;

FIG. 2 shows the discretization of the prices of the base values, as well as the allowed transitions for a condition; and FIG. 3 shows another practical example, illustrating the price of an American put option on a coarse grid by means of a small number of transitions (MC30) and, by adding the adjoint process correction in the same simulation, the estimated European option price (APC), with a volatility σ=0.4, an interest rate r=0.1 and an exercise price E=$10.

DESCRIPTION OF THE PREFERRED EMBODIMENTS

American options differ from European options, in that they can be exercised at any time before the expiration of the option, whereas European options can only be exercised on their maturity date. The estimation of American options is therefore much more difficult than the estimation of European options and requires memory- and time-intensive numerical simulations.

It is known that American and European options, under certain conditions, can be equivalent, for example, in the case of an American standard put option on a share, for which no dividend is paid out. Generally, to calculate an appropriate price for an American option, an optimal exercise strategy must be considered at each time step, which makes analytical and numerical calculations much more extensive than in the case of European options.

The estimation of American options is therefore more complex than the estimation of European options. A formula has been developed in this context that permits calculation of an early exercise option price, i.e., the price difference between the two types of options with respect to an adjoint process, which, as a function of time, develops in the backward direction of the original process that determines the development of the price of the European options. This calculation can be used in order to improve option price estimates that are obtained by numerical methods, for example, the finite-difference or Monte Carlo method.

A method has been developed, which is referred to as the adjoint process correction method (APC), which permits the calculation of the price of an American option by correction of the price of its European equivalent. Its usefulness is demonstrated by application of the APC method to two different numerical methods for an option price calculation, namely, the finite-difference method and stochastic simulation. The latter is based on a reformulation of a development equation with respect to a master equation and is frequently used in physical processes in order to model and simulate a number of both stochastic and deterministic phenomena. Unlike the finite-difference method, the stochastic simulation can be used for practically any known price dynamics.

In this case, the APC method uses both the known backward development equation, and also an adjoint process that runs forward in the direction of time. The price correction can therefore be expressed as an integral over a source term that describes the price discrepancy between the European and the American backward development operators for infinitesimal time steps that are weighted by the adjoint process. The necessary information concerning the adjoint process can often be determined analytically. If this is possible, the APC method can be used particularly simply, with simultaneously low cost, as an expansion of conventional methods. In these cases, the APC method can precisely develop information that would otherwise be interfered with by the discretization or statistical errors and therefore can yield more accurate results at only slightly higher computational effort than the simple finite-difference method or the Monte Carlo method.

Another advantage of the APC method is that it can be focused on the relevant price zones. If, for example, the present price of an option base value is $10, the option price for $20 is not particularly interesting, but, in general, the finite-difference method will provide this value nevertheless, just as all other values on a fine grid between $10 to $20, since the $20 range could be of decisive importance during the backward calculation of the final conditions. The adjoint process makes it possible to use a comparatively coarse grid between $10 and $20 and, still obtain very accurate results for the present price by compression of the initial distribution of the adjoint process at $10. For options with multiple base values, the complexity of the problem grows exponentially with the number of base values and therefore a d-dimensional space must be discretized for d base values. The capability of the APC method to yield good results, even with coarse grids, is therefore particularly advantageous in the case of numerically demanding, higher dimensional cases.

In the numerical section of the study, results are demonstrated for a single base value that follows a geometric Brownian movement and is processed with the Black-Scholes model in the self-adjoint form. However, no constraints on the APC method per se emerge in this case. For example, the stochastic simulation can be generalized to complicated processes and jump processes can be integrated in a simple fashion. In addition, there is no need for the time development operator to be self-adjoint. A constant time progression is used as starting point, and it is assumed that the development of the European option price vector P is determined by the equation $$\frac{\partial}{\partial t} P = LP \qquad (1)$$

in which the APC method can be transferred in a simple fashion to discrete time progressions.

Initially, it is demonstrated how the price of a European option can be expressed in the manner of an adjoint process. This result is used and generalized to the case of an American option, which leads to the correction formula that is used in the APC method. In a first numerical application, it is demonstrated that the APC method can be used to calculate option prices by the finite-difference method with a very coarse grid and to interpolate them. An alternative stochastic method is presented that demonstrates that the option price calculation can yield a reasonable price estimate by the adjoint process, when the statistics of the underlying Monte Carlo method yields results that are too poor to furnish reasonable results.

To start with, the price of a European option is developed in the manner of an adjoint process and definitions and invariant properties are explained. This process is initially defined and an obtained quantity found.

An adjoint process of process P of equation (1) relates to a process that is defined by the equation $$-\frac{\partial}{\partial t} P^* = L^* P^* \tag{2}$$

in which L* is the formal adjoint of the operator with the standard $L_2$ scalar product, so that $$\int_{R^d} \phi(L\psi)dx = \int_{R^d}(L^*\phi)\psi dx \tag{3}$$

applies for all ψ, φ in the definition range of L or L*. It is assumed that all φ in the definition range of L* are sharply diminishing functions or are vanishingly small for a finite definition range in the boundary region, in order to avoid problems in the boundary region during partial integration. In particular, this is presumed to be the case as a boundary condition for P*. If, for example, the dynamics is determined by an advection diffusion equation by L=U∇+DΔ, the adjoint operator L*=−U∇+DΔ, from which it is apparent that the process is uniquely defined even in the positive developing time direction, whereas the adjoint process is uniquely defined in the backward developing time direction. In the forward developing time direction, the solution to the adjoint process equation is a poorly solvable task, on account of the presence of the negative diffusion operator. Accordingly, the temporal backwards development for the original process is poorly soluble.

With these definitions, the scalar product of P and P* is time-invariant. Because of the definition of the adjoint operator in equation (3), for any time points $T_1$ and $T_2$ the following actually applies:

$$\int dx(P(x, T_2)P^*(x, T_2) - P(x, T_1)P^*(x, T_1)) \tag{4}$$

$$= \int_{T_1}^{T_2} dt \int dx \frac{\partial}{\partial t}(P(x, t)P^*(x, t))$$

$$= \int_{T_1}^{T_2} dt \int dx \left( P^*(x, t) \frac{\partial}{\partial t} P(x, t) + P(x, t) \frac{\partial}{\partial t} P^*(x, t) \right)$$

$$= \int_{T_1}^{T_2} dt \int dx(P^*(x, t)LP(x, t) - P(x, t)L^*P^*(x, t))$$

$$= 0$$

The initial or end conditions for the adjoint process can now be selected in a manner that is most appropriate for the problem being solved. For this purpose, $$P^*(x,0) = \delta(x - x_0) \tag{5}$$

is chosen, in which case $x_0$ is the asset price, at which the option is to be evaluated, and δ is the d-dimensional Dirac distribution. Advantageously, $x_0$ could be introduced as an additional parameter and $P^*(x, t; x_0)$ could be used to designate the solution of the initial value problem of equations (2) and (5). With these initial conditions, we get $$P(x_0,0) = \int dx\, P(x,T)P^*(x,T;x_0) \tag{6}$$

in which $T_1$ is set to equal 0 and $T_2$ is set to equal T in equation (4) without adversely affecting the generality of the formula.

Estimation of the option now occurs by means of an adjoint process. It is presumed that the price of a European option is determined by the following equation:

$$\frac{\partial}{\partial t}P_{eu}(S, t) = LP_{eu}(S, t). \tag{7}$$

In the model of Black & Scholes and Merton for example, L=$L_{BS}$ is the Black-Scholes operator for a risk-free interest rate r and an underlying volatility σ, which is represented by $$L_{BS} := -\frac{1}{2}\sigma^2 S^2 \frac{\partial^2}{\partial S^2} - rS\frac{\partial}{\partial S} + r. \tag{8}$$

It is apparent from the sign of the diffusion portion −(½) $\sigma^2 S^2 \partial^2/\partial S^2$ of the operator that the equation is calculated backward in time. The end conditions for a put option on their maturity date T are $$P_{eu}(S,t) = \max(S-E,0) =: F(S) \tag{9}$$

in which E is the base price of the option. With the corresponding adjoint process P*, which is given by $$\frac{\partial}{\partial t}P^* = -L^*P^* \tag{10}$$

$$P^*(x, 0; S) = \delta(x - S)$$

and equation (6), we get $$P_{eu}(S, 0) = \int dx P_{eu}(x, T)P^*(x, T; S) \tag{11}$$

$$= \int dx P^*(x, T; S)F(x)$$

$$= \int dx P^*(x, T; S)\max(x - E, 0)$$

so that the price of an option can be expressed at the expected time t=0 and the expected price S in the underlying conditions of the adjoint process. In the Black-Scholes model, this corresponds to the option price calculation formula that determines the price as the discounted expectation value of a profit for a risk-neutral stipulation.

The adjoint process is now applied to the estimation of American options. For American options, price finding at each time step entails a decision as to whether the option should be exercised or not. This makes the dynamics of the process more complicated and different approaches have been derived in order to model this dynamics, for example, as a free-boundary, linear-complementarity or optimal-stopping problem. It is assumed in this case that, for infinitesimal time steps dt, the time development of the option price is represented by the following equation:

$$P_{am}(x,t+dt) = \max(P_{am}(x,t) + LP_{am}(x,t)dt, F(x,t+dt)) \tag{12}$$

in which case F(x, t) is a payoff function that reflects the intrinsic value of the option, which depends on both the present status x of the base value, and also of time t. This formulation can be derived, for example, from the Black-Scholes model, as an explicit discretization of the corresponding linear complementary problem, as demonstrated by Wilmott, Howison and Dewynne. Similar equations can also be derived from discrete time formulations, for example, the dynamic programming equation for binomial trees.

Considering $$\max(P_{am}+LP_{am}dt,F)=P_{am}+LP_{am}dt+\max(F-P_{am}-LP_{am}dt,0) \quad (13)$$

the equation for dt→0 can be rewritten $$\frac{\partial}{\partial t} P_{am} = LP_{am} + J(F, P_{am}, t) \quad (14)$$

with a source term $$J(F, P_{am}, t) := \lim_{dt \to 0} \frac{\max(F - P_{am} - LP_{am}dt, 0)}{dt} \quad (15)$$

In the equation (15), a differential object may be defined as an object that at the previous time step had the same state/position as the object but undergoes the same (simple) dynamics as the reference object in the next step. In the case of numerical solution of an American option, this differential object would correspond to an option priced with $P_{am}+LP_{am}dt$ after a time step with size dt.

It should be noted that the source term does not vanish in the region of exercise only. In the region of exercise, in each case, $P_{am}(x, t)=F(x, t)$, so that the following is obtained:

$$J(F, P_{am}, t) := \begin{cases} \frac{\partial}{\partial t} F - LF: & x \text{ in exercise region} \\ 0: & x \text{ outside of exercise region} \end{cases} \quad (16)$$

It can also be determined without numerical simulations from equations (15) and (16) whether the American option differs from the European option. This would be possible, in particular, if it applies that $(F-P_{am}-LP_{am}dt)$ and/or $(\partial/\partial t\, F-LF) \leq 0$. In this case, the source term $J(F, P_{am}, t)$ disappears, from which it follows that the two systems behave essentially identically. A practical example for this case is an American standard put option for shares without dividends in the Black Scholes model.

It is particularly advantageous in this case that numerical efforts can be avoided, since the more easily determined price of the European option could now be determined. In addition, products could also be deliberately with this method that behave essentially like a European or American option. By selecting the payoff function F, the behavior of the option can be influenced, so that $J(F, P_{am}, t)$ becomes non-negative or non-positive. A premature exercise possibility could then be advantageous for both sides, in particular if it is known to the offering party whether an option can be offered without or with only limited risk premium as an American option.

The adjoint process P* is now defined as in equation (2) with L of equation (12), i.e., unlike $P_{am}$, the adjoint process is determined as in the case of European dynamics. If the calculation of the European options is repeated and it is assumed that the present time is zero and the exercise time T, then, without restriction of the generality, the following applies:

$$\int dx(P_{am}(x, T)P^*(x, T) - P_{am}(x, 0)P^*(x, 0)) = \quad (17)$$

$$\int_0^T dt \int dx \frac{\partial}{\partial t}(P_{am}(x, t)P^*(x, t)) =$$

$$\int_0^T dt \int dx \left( P^*(x, t)\frac{\partial}{\partial t}P_{am}(x, t) + P_{am}(x, t)\frac{\partial}{\partial t}P^*(x, t) \right) =$$

$$\int_0^T dt \int dx(P^*(x, t)LP_{am}(x, t) - P_{am}(x, t)L^*P^*(x, t) + J(F, P, t)P^*(x, t)) =$$

$$0 + \int_0^T dt \int dx J(F, P_{am}, t)P^*(x, t)$$

It is known from equation (11) that the integral $\int dx\, P_{am}(x, T) P^*(x, T) = \int dx\, F(x, t)\, P^*(x, T)$ in equation (17) is equal to the European option price $P_{eu}$. If $P^*(x, 0)=\delta(x-S)$ now applies as the initial condition of the adjoint process, and we obtain $$P_{am}(S,0)=P_{eu}(S,0)+\int_0^T dt \int dx J(F,P_{am},t)P^*(x,t;S) \quad (18)$$

from equation (17), so that the early exercise option price is expressed in the form of an integral over the incorrect price source term J, which is weighted by the adjoint process P*.

Using equation (16), equation (18) can then be further simplified to $$P_{am} = P_{eu} + \int_0^T dxt \int_{\Omega(t)} dx P^*(x, t)\left(\frac{\partial}{\partial t} - L\right)F(x, t) \quad (19)$$

in which case $\Omega(t)$ is the region of exercise at time t.

In this context, equation (16) is a generalization of the integral equations derived by Kim, Jacka, Carr, Jarrow and Myeni for the Black-Scholes model with a single base value. This formula could be used, for example, as illustrated later, for semi-analytical methods, in order to find an exercise limit. It applies in this case that, in the Black-Scholes model, equation (19) under certain conditions yields the decomposition formula that is derived in these studies.

The numerical application of the APC method in the finite-difference method is explained below. In this case, the decomposition in equations (18) and (19) is seen as a tool that improves the numerical methods for solving the problem of the estimation of American options.

There are three properties that make this equation interesting for the numerical determination of option prices:

1. The source term is different from zero only in the region of the exercise. In this region, the exact solution is also known since it equals the payoff function F. The source term can therefore be calculated with a high degree of accuracy either numerically or analytically.

2. When the adjoint process can be analytically determined, the contribution of these sources to the option price correction can be propagated with a precise transfer function $P^*(S, T; S_o)$, to $S_o$.

3. In the case of the Monte Carlo method, the double integral smoothes fluctuations in local price estimates.

The equations (18) and (19) can also be used to improve the price estimate of a simple explicit finite-difference method. To explain this, a Black-Scholes operator of equation (8) is used. The use of $$x = \ln \frac{S}{E} \quad (20)$$

$$\tau = \frac{1}{2}\sigma^2(T-t)$$

$$P = Ee^{\alpha x + \beta \tau} p(x,t)$$

with $\alpha=(\frac{1}{2})(k-1)$, $\beta=-(\frac{1}{4})(k+1)^2$, $k=2r/\sigma^2$ transforms the Black-Scholes equation into a self-adjoint form $$\frac{\partial p}{\partial t} = \frac{\partial^2 p}{\partial x^2} \quad (21)$$

that is very much easier to solve numerically. The payoff function $F(S)=\max(E-S, 0)$ is transformed into the following equation $$f(x,\tau) = e^{\frac{1}{2}(k+1)^2 \tau} \max\left(e^{\frac{1}{2}(k-1)x} - e^{\frac{1}{2}(k+1)x}, 0\right) \quad (22)$$

and the initial conditions are $$p(x,0) = f(x,0) = \max\left(e^{\frac{1}{2}(k-1)x} - e^{\frac{1}{2}(k+1)x}, 0\right) \quad (23)$$

The boundary conditions can now be derived as follows:

$$P(0,t) = Ee^{-r(T-t)} \quad (24)$$

$$P(S,t) \to 0 \text{ for } S \to \infty \quad (25)$$

An explicit finite-difference discretization of equation (21) with a normal grid $\{X_0, X_1, X_2 \ldots X_N\}$, $X_n=X_0+n\sigma x$ and with a constant time step $\delta t$ is used in order to explain the APC method in the finite difference scheme. With the help of the definition $P_n^m=p(x_n, m\delta t)$, the discretization is obtained for a European put option from $$\frac{p_n^{m+1} - p_n^m}{\delta t} + O(\delta t) = \frac{p_{n+1}^m - 2p_n^m + p_{n-1}^m}{(\delta x)^2} + O((\delta x)^2) \quad (26)$$

If the terms of order $O(\delta t)$ and $O((\delta t)^2)$ are ignored, the following difference equation is obtained:

$$P_n^{m+1} = \alpha P_{n+1}^m + (1-2\alpha)P_n^m + \alpha P_{n-1}^m \quad (27)$$

in which $$\alpha = \frac{\delta t}{(\delta x)^2} \quad (28)$$

It is known in this case that this update method is stable for $0<\alpha\leq\frac{1}{2}$. For an American option, equation (27) must be replaced by the following equation $$p_n^{m+1} = \max(\alpha p_{n+1}^m + (1-2\alpha)p_n^m + \alpha p_{n-1}^m, f_n^{m+1}) \quad (29)$$

in which $f_n^m = f(x_0+n\delta x, m\delta t)$ is the discretized payoff function. The initial and boundary equations are determined by equations (23) and (25).

Based on adjoint process corrections in the finite-difference scheme, equation (16) is used to calculate the early exercise price as an addition to the finite-difference method. Equation (21) is present in the self-adjoint form, so that $$L^* = L = \frac{\partial^2}{\partial x^2}. \quad (30)$$

The solution of the adjoint problem defined in equation (10) is $$p^*(x,\tau;x_0) = e^{-(x-x_0)^2/(2\tau)} \quad (31)$$

in which case $x_0$: $=\ln(S_0/E)$ and $S_0$ is the price of the base value to be determined, i.e., in most cases, the present price.

The exercise price $P_{am}-P_{eu}$ could be calculated by summing of max $(F-P_{am}-LP_{am}(dt,0))$ at each grid point and at each time step.

FIG. 1 shows the dependence of American option at a risk-free interest rate $r=0.1$, volatility $\sigma=0.4$ and the exercise price $E=\$10$, in which case the option expires in six months and was calculated on a coarse grid with the explicit finite-difference method (50 grid points). FIG. 1 also shows, on the same grid, the dependence of an American option by means of the adjoint process correction term, which is added to the European price. (50 grid points, APC method), and FIG. 1 also shows a reference solution that is calculated by a Crank-Nicolson scheme on a fine grid, and the corresponding price of the European option.

The results for a simulation on a coarse grid are shown in FIG. 1. Significantly better estimates of the American option price are obviously obtained, if the price is calculated by adding the early exercise price, which is calculated with equation (18), to the European option price, than in the case of the direct calculation with the finite-difference method, although, in both methods, the same grid is used and the summation of the weighted source terms requires only a limited amount of computation. It is also obvious that the linked process correction yields a smooth estimate over the entire interval, whereas the finite-difference method uses an interpolation method between grid points.

In order to demonstrate the use of equation (15) for Monte Carlo methods, i.e., the estimation of American options with the help of the stochastic simulation, it is applied to the stochastic simulation of a master equation. This is a numerical approach that has numerous applications in physics in order to solve a master equation that describes a time development of a probability $P_n$ of finding the system in state n:

$$\frac{\partial P_n}{\partial t} = \sum_m R_{nm} P_m - \sum_m R_{mn} P_n \quad (32)$$

in which case $R_{mn}$ is the transition rate for the transition of the system from state m to state n. In this case, equation (32) must be interpreted as a system of ordinary differential equations for all states.

The use of the adjoint process correction in a Black-Scholes model is shown again. In every case, this approach is not limited to this model and effects, like the stochastic volatility and jump processes, can also be integrated in a simple fashion into the master equation.

Despite its flexibility and simplicity, the stochastic simulation is not a standard method that is used in finance mathematics. Faller and Petruccione have presented a master equation approach for the option price estimation, which, however, differs in important points from the method shown here, for example, since they use constant time steps. The stochastic simulation approach of Faller and Petruccione is more rapid than the standard Monte Carlo methods, but not as effective as the approach illustrated here.

The use of the minimal process method will now be explained. The idea behind the minimal process method is to establish a simple Markov process, whose state probabilities obey the master equation (32). When a representation of the state is found, the algorithm works as follows:

1. Selection of an initial state n according to the initial conditions.
2. Adding up of the transition rates for all states m that can be achieved from state n in a single transition: $R_{tot} = \Sigma_m R_{m\,n}$
3. Advance in time by a time increment τ that is obtained from an exponential distribution and has the mean $R_{tot}$, i.e., with the probability density $\pi(\tau)=R_{tot}^{-1} \exp(-R_{tot}\tau)$
4. Selection of a new state m from all possible states with the probability $R_{mn}/R_{tot}$
5. Performance of the transition to the selected state m, i.e., n is set equal to m.
6. Go to step 2, until the increasing time is greater than or equal to the desired simulation time.

The most time consuming part of this algorithm is step 4, the selection of the actual transition, since the number of end states that can be reached from m can be very large. In the following example, it is O(N), in which case N corresponds to the number of used grid points. A linear selection algorithm would therefore also be O(N). In this case, in order to accelerate the selection process, the "dual logarithmic classes approach" of Fricke and Schnakenberg is used, in which all possible transitions are organized in reaction categories. The transition rate varies within a category at most by a factor of 2, so that transitions are selected very efficiently by a von Neumann evaluation scheme, once the reaction category is chosen. The number of reaction categories is small in this case (the number of octaves that is spanned by the minimal and maximal transition rate), so that only a few steps are required in order to select a reaction category with the probability $R_c/R_{tot}$ by a linear selection, in which case $R_c$ is the sum of all transition rates in category c.

In the interest of simplicity—as a discretization of the Black-Scholes equation by a master equation—the diffusion equation can be used again below, i.e., the Black-Scholes equation transformed into a self-adjoint form.

The process is discretized under the following assumptions:

1. An equidistant discretization of the logarithm of the price of the base value is conducted from $x_0=x_{min}$ to $x_N=x_{max}$, with $x_i-x_{i-1}=\Delta x$ for i=1 ... N.

2. The states for each space $[x_i, x_{i-1})$ are constant step functions—as shown in FIG. 2, which shows the discretization of the price of the base value and the permitted transition for a state.

3. For each space, a jump of a quasi particle to its next left or right neighbor is permitted. The particle carries a fixed, defined fraction $\Delta p$ of the option price, so that, after one jump from i to i−1, the actualized prices are $p(i, t)=p(i, t-\tau)-\Delta p$ and $p(i-1, t)=p(i-1, t-\tau)+\Delta p$ for the European option and $p(i, t)=\max(p(i, t-\tau)-\Delta p, f(i, t))$ and $p(i-1, t)=\max(p(i-1, t-\tau)+\Delta p, f(i, t))$ for an American option.

This obviously describes a random, one-dimensional path for each quasi-particle. Accordingly, the probability density of a group of quasi-particles is subject to a diffusion equation with the limit $\Delta x \to 0$. In the self-adjoint form of the equation (21), the diffusion coefficient equals one, so that the transition rate for a step process of a quasi-particle from i to i±1 is set, independently of i, at $$r=1/\Delta x^2 \quad (33)$$

The efficiency of the stochastic simulation could also be improved further by means of the introduction of net transition rates. The number of quasi-particles in space i at time t is $N_i=p(i,t)/\Delta p$. Therefore, from averaging of all transitions that begin at the present time, it is apparent that the net transfer of quasi-particles from node i to i±1 is obtained from $$j_i = \begin{cases} r(N_i - N_{i-1})\langle\tau\rangle: & N_i > N_{i\pm 1} \\ 0: & N_i \le N_{i\pm 1} \end{cases} \quad (34)$$

in which ⟨τ⟩ is the average size of the time step and this is considered by the fact that the net transition rate for each jump is introduced to each space.

$$r(i|i\pm 1) = \begin{cases} r(N_i - N_{i-1}): & N_i > N_{i\pm 1} \\ 0: & N_i \le N_{i\pm 1} \end{cases} \quad (35)$$

Using these net transition rates has two special advantages. In the first place, the movements of the occupation numbers in the spaces, i.e., in the price estimates, are sharply reduced. On the other hand, the sum over the net transition rates is far smaller than the sum over the transition rates of the quasi-particles. Since the typical time step is inversely proportional to the total transition rate, this means that the simulation is ended much more quickly.

In FIG. 3, the price of an American put option is calculated on a coarse grid by means of a small number of transitions (MC30) and the European option price (APC) is estimated by adding the adjoint process correction in the same simulation. The volatility in this example is σ=0.4, the interest rate r=0.1 and the exercise price E=$10.

As an example of a numerical experiment, FIG. 3 shows the results of an estimate for an American option, in which case a very coarse grid with 30 grid points is used and 600 transitions are carried out in a single implementation of the stochastic process. The option prices that are estimated by a backward simulation are practically without value: in many grid points, the predicted American price lies below the European price, which is impossible. The APC method is based on the same simulation and yields, by contrast, with only a slightly increased computational effort, very good estimates of the actual American option price.

Finally, and to summarize, it can be stated that the early exercise price for an American option can be represented by a compact formula, in which use is made of an adjoint process that is developed in the backward direction of time of the original process, in which case the development of the corresponding European option price is determined. This formula, in an inventive manner, generalizes an integral equation that is valid in the Black-Scholes model and that is used in the literature to derive semi-analytical methods for the estimation of American options.

It is demonstrated that the formula can be used as an addition for numerical standard methods in order to obtain decidedly better estimates of the early exercise price. This is demonstrated on the example of the Black-Scholes model for a finite-difference method. In order to demonstrate use of the formula for Monte Carlo methods, a stochastic simulation based on a master equation representation of the process is introduced. A sufficiently good estimate of the early exercise price can be obtained even for very coarse approximations with poor statistics. The reason for the good performance is that the formula permits an analytical or semi-analytical propagation of the source term generated in the exercise region to be conducted. Consequently, the greatest cause for numerical errors lies in uncertainty of the location of the exercise limit.

Obviously, the adjoint process can also be used to develop new semi-analytical and numerical methods. If, for example, one has an initial estimate of the exercise limit, the stochastic simulation method can be altered in such a manner, that one can operate in the exercise region without discretization, since the prices, and therefore the transition rates, are known there analytically. In the following areas, the values can be calculated by summing the adjoint process corrections over the exercise region, so that, in the case of a self-consistent calculation, a very coarse discretization about the limit is sufficient. In combination with the fact that estimates obtained by an adjoint process are usable even with very coarse grids, it follows that the method can also be used very well for estimates of options with several base values.

Finally, the adjoint process offers a particularly good possibility of interpolating and extrapolating prices that are also calculated with coarse grids.

The following explicit breakdown of the price of an American put option into the European price and the early exercise price in the Black-Scholes model is known in the literature:

$$P_{am}^{BS}(S_0, 0) = P_{eu}^{BS}(S_0, 0) + rE \int_0^T e^{-rt} N\left(-\frac{\ln B_t/S_0 + \left(r - \frac{1}{2}\sigma^2\right)t}{\sigma\sqrt{t}}\right) dt \quad (36)$$

in which case $B_t$ is the location of the exercise limit at time t and $$N(x) := (2\pi)^{-1/2} \int_{-\infty}^x e^{-\xi^2} d\xi \quad (37)$$

applies.

This is a special case of equation (19), since, when $L=L_{BS}$ the adjunct operator from equation (8) is obtained from $$L_{BS}^* = -\frac{1}{2}\sigma^2 S^2 \frac{\partial^2}{\partial S^2} + \left(r - \frac{3}{2}\sigma^2\right)S\frac{\partial}{\partial S} + 2r - \sigma^2 \quad (38)$$

as can be demonstrated by the partial integration in the determining equation of the adjoint operator; see equation (3). The adjoint operator, in this case, is not identical to the Black-Scholes operator, but has a similar structure. The adjoint problem $$\frac{\partial}{\partial t}P^* = -L_{BS}^* P^* \quad (39)$$

$$P^*(S, 0; S_0) = \delta(S - S_0)$$

can be solved analytically by the same methods used to derive the Black-Scholes formula, in which case significantly simpler initial conditions can be used. The result is $$P^*(S, t; S_0) = S_0^{-1} \exp\left(-\frac{(\ln S - \ln S_0 - (r - 3/2\sigma^2)t)^2}{2\sigma^2 t}\right) \frac{e^{-(2r-\sigma^2)t}}{\sqrt{2\pi\sigma^2 t}} \quad (40)$$

The payoff function of an American put option is $$F(S,t) = F(S) = \max(E-S, 0) \quad (41)$$

so that, within the exercise region, the following applies $$\left(\frac{\partial}{\partial t} - L_{BS}\right) F(S, t) = rE \quad (42)$$

The exercise region, in this case, is the interval $\Omega(t) = [0, B_t]$ and it follows from equation (19) that $$P_{am}^{BS}(S_0, 0) = P_{eu}^{BS}(S_0, 0) + \quad (43)$$

$$\int_0^T dt \int_0^{B_t} dS \frac{rE}{S_0} \exp\left(-\frac{(\ln S - \ln S_0 - (r - 3/2\sigma^2)t)^2}{2\sigma^2 t}\right) \frac{e^{-(2r-\sigma^2)t}}{\sqrt{2\pi\sigma^2 t}}$$

By the substitution $\zeta = \ln S/S_0$, and the quadratic expansion in the resulting exponential argument, this can be brought into the form of equation (36).

With respect to the additional advantageous embodiments and modifications of the method in accordance with the invention, the general description and the enclosed claims are referred to in order to avoid repetitions.

Finally, it must be expressly pointed out that the practical examples described above serve only to explain the claimed teachings, but that said teachings are not restrict to the practical examples.

The invention claimed is:

1. A method for determining a position, in particular a future position, of an object, in particular of a particle or the like, comprising:
   determining a progression of the position of a reference object passing through a process;
   forming differences of positions between the object and the reference object;
   forming error position terms from the differences;
   weighting the error position terms with at least one correction factor,
   wherein the error position terms weighted with the correction factor are added up, and the position of the object is determined by adding the weighted and summed error position terms to the position of the reference object; and
   outputting, displaying, storing or otherwise conveying said determined position of the object.

2. The method according to claim 1, wherein the correction factor is calculated by an adjoint process.

3. The method according to claim 2, wherein the adjoint process, as a function of time, runs in the direction opposite to the process of the reference object.

4. A method for determining a position, in particular a future position, of an object, in particular of a particle or the like, comprising:
   determining a progression of the position of a reference object passing through a process;
   forming differences of positions between the object and the reference object;
   forming error position terms from the differences;
   weighting the error position terms with at least one correction factor,
   wherein the object is a first option, the reference object is a second option, the position is an early exercise price, the error position terms are error price terms, and the correction factor is a constant number; and
   outputting, displaying, storing or otherwise conveying said early exercise price.

5. The method according to claim 4, wherein the second option is a European equivalent of the first option, the first option being an American option.

* * * * *